United States Patent [19]

Brobeck

[11] 4,102,220

[45] Jul. 25, 1978

[54] MULTI-RING INERTIAL ENERGY STORAGE WHEEL HAVING TAPERED RING MOUNTING MEMBERS

[75] Inventor: William M. Brobeck, Orinda, Calif.

[73] Assignee: Electric Power Research Institute, Inc., Palo Alto, Calif.

[21] Appl. No.: 701,825

[22] Filed: Jul. 1, 1976

[51] Int. Cl.² ............................................. F16C 15/00
[52] U.S. Cl. ..................................................... 74/572
[58] Field of Search ................. 74/572, 573 R, 573 F, 74/574; 310/67; 403/355, 365, 319

[56] References Cited

U.S. PATENT DOCUMENTS

| 1,817,054 | 8/1931 | Baudry | 74/572 |
|---|---|---|---|
| 3,683,216 | 8/1972 | Post | 310/67 |

Primary Examiner—Stephen C. Bentley
Attorney, Agent, or Firm—Townsend & Townsend

[57] ABSTRACT

An inertial energy storage wheel defined by a plurality of independent, concentric rotor ring assemblies and a center hub rotatable about a vertical axis. The hub includes a plurality of spaced-apart, radially oriented teeth having sides parallel to the axis of rotation which diverge in a radially outward direction, which lie on radii having their origin at the axis of rotation of the wheel, and which are engaged by correspondingly shaped holes of the innermost ring assembly carried by the hub. The holes have radially outwardly diverging vertically oriented side walls which snugly engage the sides of the teeth when the wheel is at rest as well as during high speed operation of the wheel when the rotor ring assembly dilates and moves radially outward with respect to the teeth. Additional rotor ring assemblies are concentrically disposed about the innermost assembly and connected thereto so that the rotor ring assemblies can dilate by differential amounts. The rotor ring assemblies are constructed of a plurality of coaxial rings held together by U-shaped clamps and the tooth receiving holes of the innermost assembly are defined by opposing, aligned grooves in opposing end faces of the rings.

21 Claims, 5 Drawing Figures

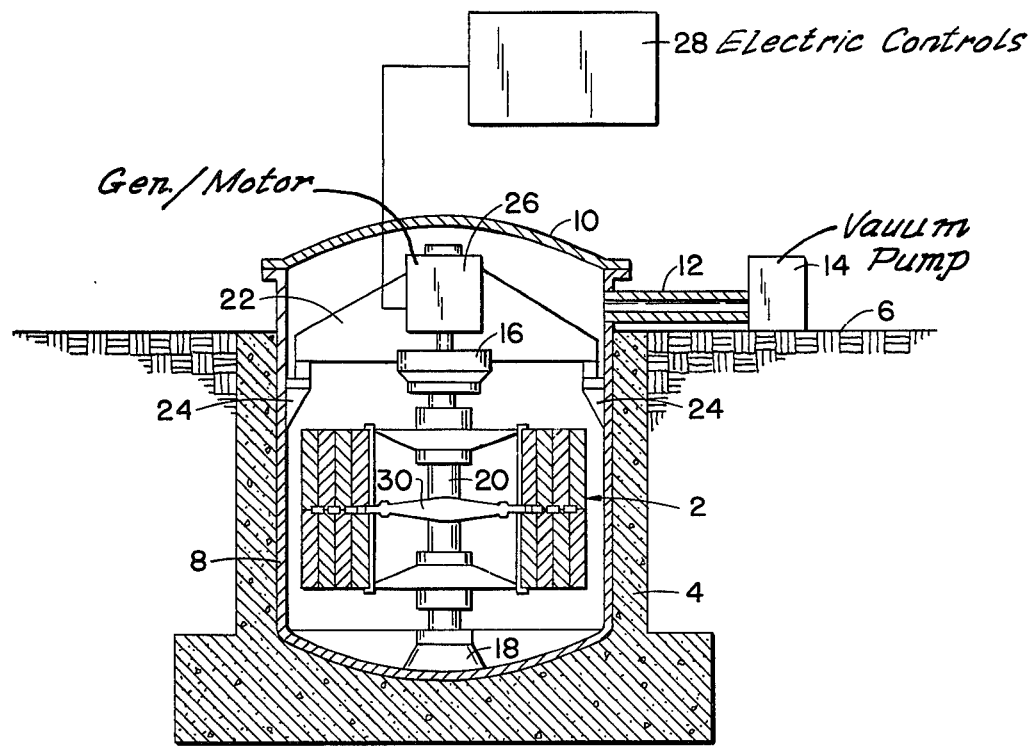
FIG._1.
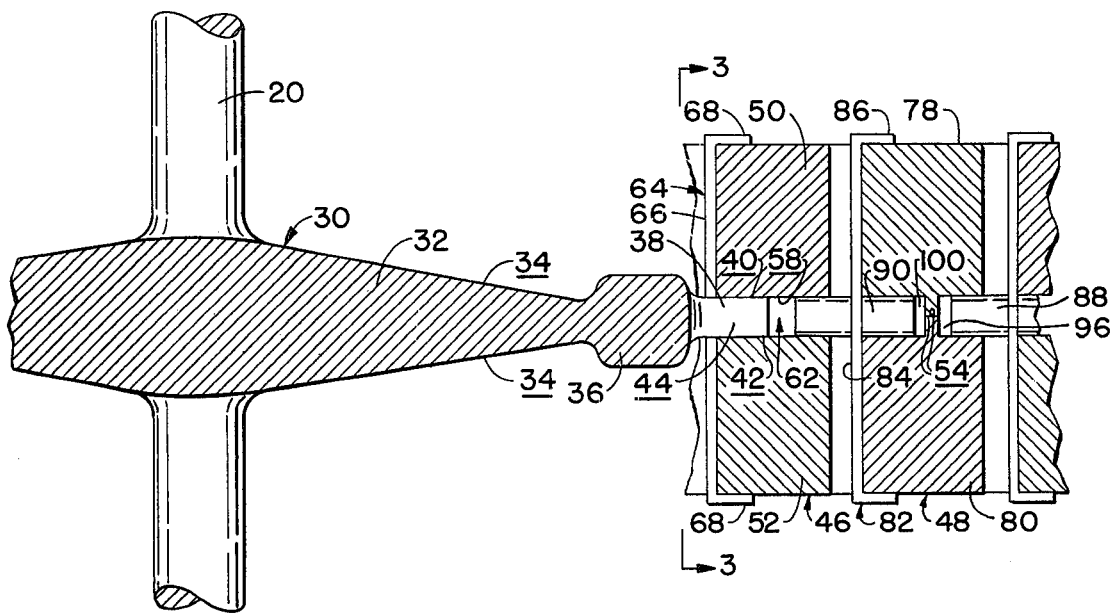
FIG._2.

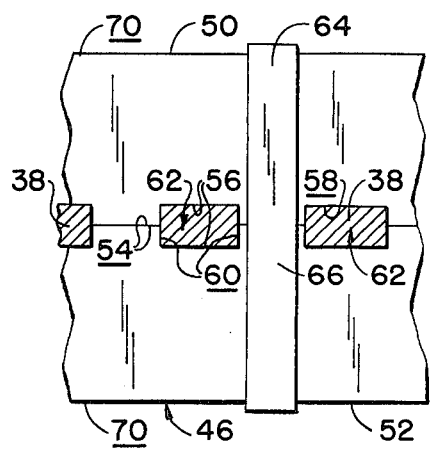
FIG._3.
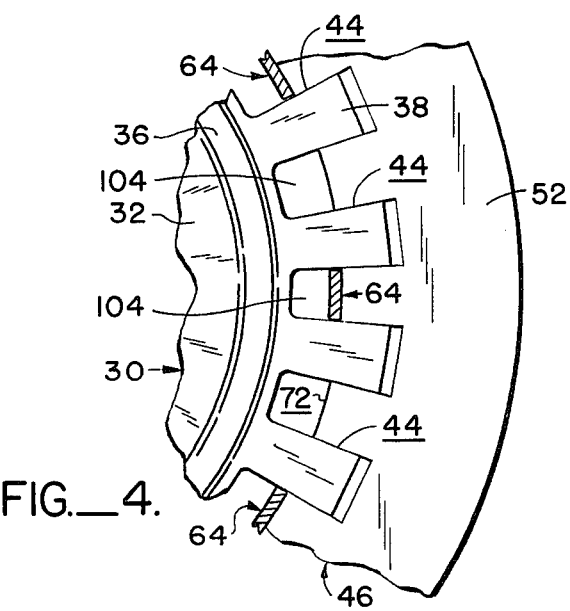
FIG._4.
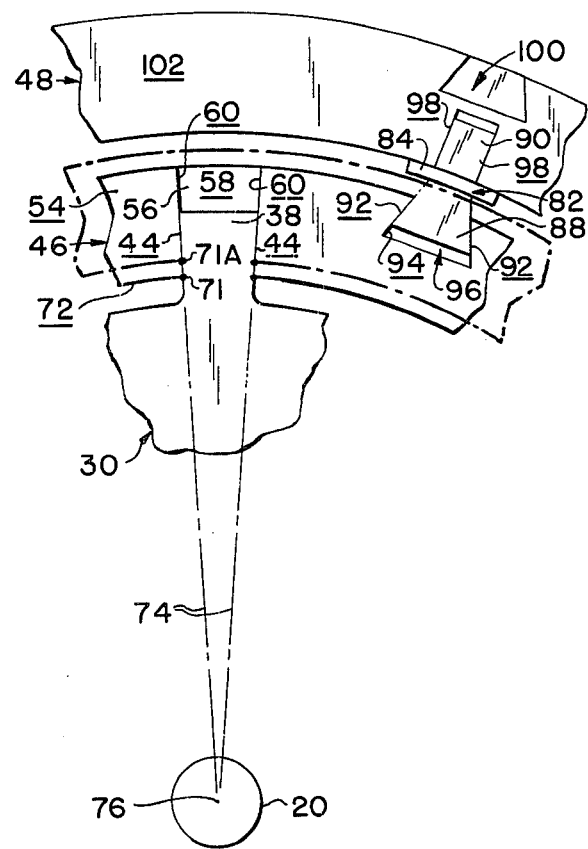
FIG._5.

MULTI-RING INERTIAL ENERGY STORAGE WHEEL HAVING TAPERED RING MOUNTING MEMBERS

RELATED APPLICATIONS

The subject matter of this application is related to the simultaneously filed, copending patent application of the inventor entitled IMPROVED RING ASSEMBLY FOR INERTIAL ENERGY STORAGE ROTOR bearing Ser. No. 701,826, filed July 1, 1976. The disclosure of this related application is incorporated by reference.

BACKGROUND OF THE INVENTION

Today's energy shortages make it increasingly necessary to store energy which becomes available during periods of relatively low energy demand for use during peak demand periods. For example, solar energy is readily available during relatively low daytime demand periods, but is frequently unavailable during the peak evening hour demand periods.

It has been suggested to store excess energy with inertial energy storage wheels or rotors. Such energy storage requires that excess energy, normally electrical power, is used to drive an electrical motor-generator to spin the rotor at often very high rates of rotation. To recover the energy, the motor-generator is operated in its generator mode to generate electricity while correspondingly decreasing the rotor's rate of rotation, thereby converting the rotor's inertial energy into electrical power. To store a meaningful amount of energy, the rotors have to be spun at rates as high as 20,000 rpm and more, depending on their diameter. This severely stresses the rotor and requires that it be specially constructed so that it can withstand the centrifugal forces generated by such high rates of rotation.

It is known that the stress to which a rotating ring is subjected comprises both hoop or circumferential stresses, which subject the ring material to tension, and radial stresses which subject the material to translaminar tension. In the radial direction the tensile stresses are carried by the matrix material only which is relatively weak. Since the radial tensile stress depends upon the ring thickness to radius ratio, the ring must be relatively thin to maintain the stresses within the limits of the matrix material.

To achieve the necessary high energy storage densities requires materials with a high strength-to-weight ratio. The materials with the highest strength-to-weight ratios currently are fiber materials such as those used for the reinforcement of plastic composites. The fiber composites, therefore, offer the potential of very high energy storage densities. Problems exist, however, due to the orthotropic properties of the composites. They possess very high strength in the direction of the fibers, that is in the circumferential direction, and very little strength in the transverse direction, that is, in a radial direction. Thus, fiber composite materials can withstand only very limited radial forces.

A theoretical ring with no radial thickness would not be subjected to any radial stress, but to hoop stresses only. Thus, to limit the radial stresses in such rings to acceptable values, their radial thickness must be relatively small. Accordingly, it has been suggested to construct inertial energy storage rotors by combining a plurality of relatively thin, concentric rings into one rotor. The rings are mounted to a concentric hub, which in turn rotates about a vertical axis. The rings are interconnected by resilient, e.g., elastomeric spacers disposed between each pair of adjacent inner and outer rings, U.S. Pat. Nos. 3,683,216 and 3,741,034 generally describe the construction of inertial energy storage wheels constructed of a plurality of concentric rotor rings carried by a common hub. Elastomeric spacer rings connect each inner ring to its adjacent outer ring.

During operation of the rotor wheel the rings dilate, that is, they expand by differing amounts which are directly related to their mean diameters. Consequently, the inter-ring connection as well as the connection of the innermost ring to the rotating hub must freely accommodate the relative inter-ring dilations as well as the dilation of the innermost ring with respect to the hub. Failure to do so would subject the rings to severe stresses which, as a practical matter, cannot be withstood by today's materials if the rotor wheel is to be spun at a meaningful, that is, a very high rate of rotation.

One method for mounting the innermost ring to the hub and of interconnecting the concentric rings is to provide radially oriented bars which snugly engage corresponding holes in the rings. Such bars center the rings with respect to each other and when the bars snugly engage corresponding holes in the ring they substantially immovably interconnect the rings. When the wheel rotates the radially oriented bars permit the rings to dilate and to move in a radial direction relative to the bars. The earlier mentioned danger of locking one ring to the other and of thereby losing the advantages obtained by constructing the rotor wheel of multiple, relatively thin rings is thereby prevented.

A drawback of such a construction, however, is the fact that as the rotor rings dilate they expand circumferentially. The width of the bar receiving holes expands proportionally. The initial, at rest snug fit between the bars and the holes is lost and some play between them develops. Although the play might be relatively small, at the high rates of rotation under consideration here, such play can prove fatal and in any event introduces a vibrational instability which, if not damaging to the rotor wheel itself, can lead to the premature failure of the bearings for the wheel and of associated equipment.

SUMMARY OF THE INVENTION

The present invention is directed to providing a hub to innermost ring as well as an inter-ring connection which can accommodate differential ring dilations, that is, which permits the rings to expand freely in accordance with their dimensional characteristics and irrespective of the degree of expansion of adjacent rings or of the hub. At the same time, the above-discussed danger of losing the snug fit between the rings and the radially oriented connecting bars is eliminated.

The present invention therefore provides an inertial energy storage wheel having at least one rotor ring having an axially oriented end face and a plurality of radially oriented grooves in the end face. A plurality of radially oriented connecting members having a shape complementary to the shape of the grooves is disposed therein. The connecting members protrude in a radial direction past an end of the grooves. Mounting means which is radially spaced from the rotor is provided and attached to the protruding end of the connecting members so that rotational forces can be transmitted between the rotor and such mounting means. The connecting members have diverging sides which are generally parallel to an axis of the rotor and the grooves receiving the connecting members have side walls which diverge in accordance with the sides of the connecting members to establish a snug fit between the connecting member sides and the groove side walls when the rotor is at rest. The divergency of the sides and of the side walls has a magnitude and an orientation so that upon dilation of the rotor during its rotation the rotor and the connecting members are permitted to move with respect to each other in a radial direction while the side and the side walls of the connecting members and the grooves, respectively, remain in mutual contact and engagement. The snug fit between them is therefore maintained at all times.

In a more specific embodiment of the present invention the connecting members comprise radially oriented teeth and the mounting means attached to the connecting members comprise a central hub for the energy storage wheel which is integrally constructed with the teeth. In this embodiment of the invention, each tooth is defined by a pair of spaced-apart sides which are generally parallel to the axis of rotation of the hub and which are further angularly inclined with respect to each other so that the extensions of the side converge at the axis of rotation of the hub.

A rotor ring assembly is defined by a plurality, e.g. two coaxial rotor rings having opposing, axially oriented end faces and including a plurality of aligned groove pairs in the opposing end faces. Each groove pair defines a tooth receiving, radially oriented hole and each groove includes side walls which are parallel to the axis of rotation and which converge in a radially inward direction complementarily to the sides of the teeth. Consequently, each tooth receiving hole has radially inwardly converging, axially oriented side surfaces or walls which snugly engage the corresponding sides of the teeth when the wheel is at rest. Means is further provided for securing the rings to each other with the teeth disposed in the holes.

When the energy storage wheel of the invention is spun, a resulting dilation of the rotor assembly causes a relative radial motion between the teeth and the holes along the sides of the teeth and the side walls of the holes. Since the side and the side walls lie on a radius having its center at the axis of the hub a snug, play-free engagement between the teeth and the rotor assembly holes is assured during high speed rotation of the wheel.

The present invention also provides a connection between adjacent rotor ring assemblies. This connection includes a plurality of radially oriented interconnecting bars having inner and outer portions in engagement with the adjacent inner and outer rotor ring assemblies, respectively. The inner bar has radially inwardly diverging sides and the bar is permitted to move radially outward as the outer rotor ring assembly dilates so that there is a relative radial movement during operation of the wheel between the inner bar portion and a corresponding outwardly opening aperture of the inner rotor assembly. The angle of inclination between the diverging sides is chosen so that an increase of the width of the aperture (caused by the dilation of the inner rotor assembly) is compensated by the relative outward movement of the inner bar portion and a corresponding effective increase of the width of the inner bar portion in engagement with the aperture. The detailed construction of the inner bar portion and the selection of the angle of inclination between them is more fully set forth in the above-referenced copending patent application of the inventor.

From the foregoing, it is apparent that the present invention provides a snug, virtually play-free connection between a hub and the innermost ring rotor ring assembly and between adjacent rotor ring assemblies which dilate by differential amounts. In the case of a hub to rotor ring connection the diameter of the hub remains substantially constant even when spun at a high rate; that is it dilates so much less than the rotor ring that the hub's dilation can normally be disregarded. However, any hub dilation that does occur is readily compensated for by correspondingly changing the angularity of the mating groove and hub teeth side walls so that the side walls do not converge exactly at the center of rotation. For purposes of this application and the claims expressions to the effect that the side walls be on a radius of the wheel, are radially oriented, move relative to each other along a radius, etc. are intended to and do include side walls which are exact radii (and which therefore do not attempt to compensate for the dilation of the hub) and side walls which are only approximately on a radius (because compensation has been made for the small dilation of the hub).

Returning now to the case of the hub to rotor ring connection, as the rotor ring mounted to the hub dilates the snug tooth to rotor ring connection is maintained while the rotor ring is permitted to freely dilate. The formation of undesirable and potentially fatal radial stresses is thereby prevented. At the same time, the formation of play between the hub and the ring and a resulting vibrational instability of the connection between them is prevented. This is accomplished with rigid connecting members, e.g. metallic teeth integrally constructed with the metallic hub and without the need for elastomeric spacer rings with their many shortcomings. Consequently, the present invention substantially improves the contruction and operation of inertial energy storage wheels capable of being spun at very high rates of rotation.

BRIEF DESCRIPTION OF THE DRAWINGS

FIG. 1 is a schematic, elevational view, in section, illustrating an inertial energy storage wheel installation incorporating a multiple ring rotor wheel constructed in accordance with the present invention;

FIG. 2 is an enlarged, fragmentary, side elevational view, partially in section, illustrating the rotor wheel of the present invention and in particular the hub to rotor ring assembly connection in greater detail;

FIG. 3 is a fragmentary side elevational view, in section, of the rotor wheel and is taken on line 3—3 of FIG. 2;

FIG. 4 is a fragmentary plan view of the peripheral portion of a wheel constructed in accordance with the invention and shows the hub to rotor ring assembly connection only; and FIG. 5 is a schematic plan view illustrating the construction of the hub-to-ring and the inter-ring connections of the present invention and further illustrates the effect of the ring dilation on the hub-to-ring connections.

DESCRIPTION OF THE PREFERRED EMBODIMENTS

Referring first to FIG. 1, an installation employing an inertial energy storage wheel or rotor 2 constructed in accordance with the invention is schematically illustrated. The rotor is disposed in a concrete housing 4 in ground 6 and is lined with an impact resistant material such as steel defining an airtight, upwardly open tank 8 closed by a cover 10. A fluid conduit 12 connects the interior of the tank with a vacuum pump 14 for evacuating the interior of the tank to as low a pressure as one-tenth millitorr.

Mounted within tank 8 are upper and lower bearings 16 and 18 which journal a rotor shaft 20 for rotation about a vertical axis. The upper bearing is supported by a spider 22 carried on pedestals 24 which protrude from the inner wall of tank 8. The spider also supports a generator motor 26 which is suitably coupled to rotor shaft 20 and which is controlled by electric controls 28 so that it can alternatively be operated in its generator or its motor mode for alternatively converting inertial energy of the rotating wheel 2 into electricity or for converting electricity into inertial energy by correspondingly increasing the rate of rotation (hereinafter sometimes referred to as "rotation") of the wheel. The detailed construction of the electric controls 28 is well-known to those skilled in the art and, therefore, is not further described herein.

Referring now to FIGS. 1–5, rotor 2 comprises a hub 30 rigidly mounted to shaft 20 and defined by a center disc 32 having outwardly converging sides 34, that is, having a cross-section which decreases from a maximum in the vicinity of shaft 20 to a minimum at the outermost periphery of the disc. Joined to and integrally constructed with the disc is an annular element 36 which has a thickness greater than the thickness of the disc portion joined to the element. A plurality of equally spaced teeth 38 protrude from the annular element 36 in a radial direction.

The teeth are defined by parallel top and bottom surfaces 40, 42 and by a pair of spaced-apart sides 44 which are parallel to the axis of rotation of the wheel, or transverse to center disc 32, and which diverge in a radially outward direction. The sides are further constructed so that they form sides of a segment of a circle having its center at the axis of rotation of the hub or, in other words, so that the sides converge at the center of shaft 20 for purposes more fully described hereinafter. A first, innermost rotor ring assembly 46 is coaxially attached to the hub via teeth 38 and one or more additional second or outer rotor ring assemblies 48 are coaxially secured to the first rotor ring assembly in a manner more fully described hereinafter.

The innermost rotor assembly 46 is constructed of a pair of like, coaxial rings 50, 52 which have opposing, axially oriented end faces 54 in which a plurality of radially oriented grooves 56 are formed. Each of the grooves is defined by a bottom surface 58 and a pair of opposite, radially oriented side walls 60 which diverge in a radially outward direction and which have as a common point of origin the center of the rings and, therefore, the axis of rotation of the wheel. The bottom surfaces and the side walls of the grooves are formed complementarily to the corresponding top and bottom surfaces 40, 42 and the sides 44 of teeth 38 so that each pair of opposite, aligned grooves forms a tooth receiving, radially oriented hole 62. U-shaped clamps 64 having an axially oriented center section 66 and radially outwardly protruding lips 68 engaging free end faces 70 of rings 50, 52 secure the rings to each other, to teeth 38 and, thereby, to hub 30. It should be observed that grooves 56 are dimensioned so that teeth 38 and in particular sides 44 of the teeth are snugly engaged by side walls 60 of the hole when the rotor wheel 2 of the present invention is at rest. Furthermore, for applications in which two or more rotor assemblies are provided the teeth are dimensioned so that they extend over slightly less than the width of rings 50, 52. In this manner, space is provided for attaching the next outer rotor assembly to the innermost rotor assembly as is more fully set forth below.

In operation, and with the innermost rotor ring assembly 46 assembled over hub teeth 38 as hereinafter more fully described, the rings 50, 52 will dilate as the rate of rotation increases. FIG. 5 shows in phantom lines the relative position of the dilated ring. It will be observed that by virtue of the ring's dilation and its relative radial outward movement, the intersection 71 between groove side wall 60 and the inner, cylindrical surface 72 of rings 50, 52 moves outwardly in a radial direction. Since the hole side walls 60 (as well as tooth sides 44) are radially oriented, that is, they lie on a radius 74 of center of rotation 76 of shaft 20, the hole side walls effectively slide along the sides of the teeth until intersection point 71 is at point 71A illustrated in FIG. 5. Thus, the snug rest engagement between teeth 38 and holes 62 is maintained during high speed operation of wheel 2, the only difference being that the depth to which tooth 38 enters hole 60 is slightly less during high speed operation.

The description of the relative movement between tooth sides 44 and groove side walls 60 assumes that the hub 30 does not dilate. As indicated earlier, the minute hub dilation which does take place can normally be disregarded. However, for the sake of preciseness it should be stated that even the minute hub dilation can be compensated for by correspondingly varying the angle between tooth and groove side walls 60 and 44, respectively, so that their extension lines 74 do not converge at the exact center of rotation 76. However, as indicated above the hub dilation can be disregarded without noticeably compromising the snug tooth-to-groove fit.

Upon deceleration an inverse radial movement between teeth 38 and rings 50, 52 takes place until the intersection of hole side walls 60 and inner ring surface 72 is again at the point 71 illustrated in FIG. 5.

From the foregoing description, it is apparent that the interconnection between hub teeth 38 and the first rotor ring assembly 46 is at all times snug and free of circumferential play. The high speed operating characteristic of the wheel is thereby substantially enhanced because vibrations due to a looseness in the connection between the hub and the innermost ring assembly are eliminated.

The outer rotor ring assemblies 48 are likewise constructed of like, coaxial rings 78, 80 secured to each other by a plurality of circumferentially spaced-apart, U-shaped clamps 82 which have an axially oriented center section 84 and radially outwardly protruding lips 86. In addition, however, clamps 82 include a radially inwardly and a radially outwardly extending plug member 88 and 90, respectively, for securing the outer rotor ring assembly 48 to the inner rotor ring assembly 46.

The detailed construction of plug members 88 and 90 is set forth in the above-referenced copending patent application of the inventor. To briefly summarize it, however, the plug members protrude perpendicularly from the center portion 84 and they have a generally rectangular cross-section. The inwardly extending plug member 88 diverges in a radially inward direction, that is, it has axially oriented sides 92 which diverge in a radially inward direction and which are received by correspondingly diverging side walls 94 of a radially oriented hole 96 defined by opposing, aligned grooves in end faces 54 of inner rings 50, 52. The outwardly extending plug member 90 has parallel sides 98 received in a complementarily shaped hole 100 also defined by opposing, axially aligned grooves in the opposing end faces 102 of outer rings 78, 80.

The assembly, installation and operation of inertial energy storage wheel 2 of the present invention should now be apparent. The wheel is assembled by first assembling the outermost rotor ring assembly 48 which is done by placing rings 78, 80 on top of each other, aligning grooves 80 in the opposing ring and end faces and applying clamps 82 by inserting the outer plug member 90 into the inwardly opening holes 100. Clamp lips 86 thereby engage the free ring end faces and secure both rings to each other. The next adjacent ring assembly 48 is now assembled by aligning the grooves forming the outwardly opening holes 96 in the opposing ring end faces thereof with the inner plug members 88. The opposing end faces are brought together over the plug members 88 and a set of clamps is applied to this assembly in the same manner in which the clamps were applied to the outermost ring assembly. This procedure is repeated for all outer rotor ring assemblies 48.

To assemble the innermost rotor ring assembly 46 and install it on hub 30, one ring, e.g, lower ring 52 is aligned with the inwardly extending plug members 88 of clamps 82 of the last outer ring assembly 48 and thereafter hub 38 is placed over ring 52 by aligning teeth 38 with grooves 56 in end face 54 of the ring. The upper ring 50 is now placed over the hub, its grooves 56 are aligned with teeth 38 and the upper ring is brought down until groove bottom surfaces 58 of rings 50, 52 engage the top and bottom tooth surfaces 40, 42. Thereafter, a plurality of clamps 64 are applied by threading the clamps through openings 104 between adjacent teeth 38, the inner ring surface 72 and the periphery of annular hub element 36 as is best illustrated in FIG. 4 and by engaging ring end faces 70 with the radially protruding lips 68 of the clamps. This completes the assembly and installation of wheel 2 and upon mounting the wheel in tank 8 in the above-described manner it is ready for operation.

The effect of the high speed operation of wheel 2 on the hub 30 to innermost rotor ring assembly 46 has already been described above. The high speed rotation of the wheel also dilates the outer ring assemblies 48 and increases their diameter. As a result, the width of holes 96 and 100 increases proportionally. Sides 92 of inwardly extending plug member 88 and side walls 94 of outwardly extending hole 96 receiving plug member 88 diverge in a radially inward direction and the angle between the sides and side walls is chosen so that the circumferential enlargement of the radially outwardly opening hole 96 is exactly compensated by the radially outward movement of clamp 82 (as a result of the dilation of the outer ring assembly) and, consequently, of plug 88. By properly choosing the angle of inclination between the plug sides and the corresponding hole side walls, the relative radial movement of the plug member is employed to compensate for the circumferential enlargement of the hole so that the inwardly extending plug member at all times snugly engages the side walls of hole 96. Details of the selection of the angle of inclination are more fully set forth in the above-referenced copending patent application of the inventor.

A corresponding compensation for the circumferential enlargement of the inwardly extending holes 100 receiving outwardly extending plug members 90 is not possible so that some small play will develop between them. The overall play, however, between adjacent inner and outer rotor ring assemblies is nevertheless reduced by a factor of approximately 50%. In addition, no play develops between the hub and the innermost ring assembly 46. This translates directly into a corresponding reduction of possible vibrations during the operation of the wheel.

I claim:

1. In an inertial energy storage wheel having at least one rotor, the rotor including an axially oriented end face and a plurality of radially oriented grooves in the end face, a plurality of radially oriented connecting members having a shape complementary to a shape of the grooves and disposed therein, the connecting members protruding in a radial direction past the grooves, and mounting means radially spaced from the rotor and attached to the connecting members for the transmission of rotational forces between the rotor and such means, the improvement to the rotor and the connecting member comprising: a connecting member having diverging sides extensions of which generally intersect at an axis of the rotor, and a groove in the rotor having side walls which diverge in accordance with the sides of the connecting member to form a snug fit between the sides and the side walls when the rotor is at rest, the divergency of the sides and of the side walls having a magnitude and an orientation such that upon dilation of the rotor during its rotation, the rotor and the connecting members are permitted to move with respect to each other in a radial direction while the sides and the side walls of the connecting members and the grooves, respectively, remain in mutual contact and engagement and maintain their snug fit.

2. An inertial energy storage wheel according to claim 1 wherein the connecting members comprise spaced-apart connecting members which are independent of each other.

3. An inertial energy storage wheel according to claim 2 wherein the mounting means comprises another rotor having an end face provided with grooves that match and engage portions of the members protruding from the first mentioned rotor.

4. An inertial energy storage wheel according to claim 1 wherein each rotor is defined by a plurality of coaxial rings having like inner and outer diameters and opposing end faces, wherein each of the opposing end faces defines corresponding, aligned grooves, wherein the connecting member is disposed in the aligned, opposing grooves of the adjacent rings and simultaneously engages the rings, and further including means constraining the rings to each other.

5. An inertial energy storage wheel according to claim 4 wherein the constraining means comprises a plurality of U-shaped clamp means having an axially oriented center section and a pair of radially oriented lips engaging free end faces of the rings and thereby securing the rings to each other.

6. An inertial energy storage wheel according to claim 1 wherein the mounting means and the connecting members are integrally constructed.

7. An inertial energy storage wheel according to claim 1 wherein the mounting means comprises a central hub for the wheel.

8. An inertial energy storage wheel according to claim 1 wherein the rotor comprises a plurality of opposing, coaxial rings having opposing, axially oriented end faces, wherein axially aligned pairs of grooves are defined in the opposing end faces of the ring, and wherein each connecting member is disposed in both grooves of each pair of aligned grooves and simultaneously engages side walls of both rings.

9. An inertial energy storage wheel according to claim 1 including means constraining the rings to each other.

10. An inertial energy storage wheel according to claim 9 wherein the constraining means comprises a plurality of circumferentially spaced-apart, U-shaped clamps, each clamp having an axially oriented center section and radially oriented lips protruding from ends of the center section and engaging free end faces of the rings to thereby secure the rings to each other.

11. An inertial energy storage wheel comprising: a hub for rotation about its axis' at least one rotor ring assembly defining a plurality of circumferentially spaced-apart, radially oriented holes, each hole having side walls which are substantially parallel to and extensions of which intersect at an axis of rotation of the hub and which diverge with respect to each other in a radially outward direction; and connecting members disposed in the holes for connecting the ring assembly to the hub, the connecting members including axially oriented, radially outwardly diverging sides dimensioned and shaped complementarily to the side walls of the holes for snugly engaging the side walls, the connecting members being further attached to the hub for rotation therewith and for the transmission of rotational forces between the ring assembly and the hub; the angle of inclination between the sides and between the side walls being chosen so that the side walls of the holes and the sides of the connecting members, respectively, remain in snug engagement during rotation of the wheel, the circumferential dilation of the ring assembly and a corresponding relative radial movement between the connecting members and the holes, to thereby prevent radial play between the hub and the ring assembly and a resulting virbrational instability of the wheel.

12. An inertial storage wheel according to claim 11 wherein the connecting members comprise radially oriented teeth projecting from the hub.

13. An inertial energy storage wheel according to claim 12 wherein the teeth and the hub are integrally constructed.

14. An inertial energy storage wheel according to claim 13 wherein the teeth extend over less than a full radial width of the ring assembly.

15. An inertial energy storage wheel according to claim 14 wherein the teeth extend over less than about one-half the width of the ring assembly.

16. An inertial energy storage wheel according to claim 13 wherein the hub comprises a disc portion extending from a center of the hub towards but terminating short of the teeth, the disc portion being defined by radially outwardly converging sides, and an annular portion disposed between the disc portion and the teeth, integrally constructed therewith and having an enlarged cross-section relative to the disc portion to thereby distribute radial forces from the teeth over the disc and prevent excessive stress concentrations in the hub.

17. An inertial energy storage wheel comprising:

a rotatable hub including a disc-shaped center section and a plurality of spaced-apart, radially oriented teeth extending from a periphery of the center section, each tooth being defined by a pair of spaced-apart sides oriented transversely to the center section and being angularly inclined with respect to each other so that extensions of the sides converge at the axis of rotation of the hub;

a rotor assembly carried by the teeth for rotation with the hub, the rotor assembly being defined by a plurality of coaxial rings with opposing, axially oriented end faces, the rings including a plurality of aligned groove pairs in the opposing end faces so that each pair of opposing grooves defines a tooth receiving, radially oriented hole, each groove including sides walls which are transverse to the center portion of the hub and which converge in a radially inward direction complementarily to the sides of the teeth so that each hole has radially inwardly converging, axially oriented side surfaces snugly engaging the sides of the teeth when the wheel is at rest; and means securing the rings to each other with the teeth disposed in the holes;

whereby the high speed rotation of the wheel and a resulting dilation of the rotor assembly causes relative radial motion between the teeth and the holes while the sides of the teeth and the side surfaces of the holes remain in snug, play-free engagement during such high speed rotation of the wheel.

18. An inertial energy storage wheel according to claim 17 including at least one additional, second rotor assembly disposed radially outward of and concentric with the first mentioned rotor assembly; the second rotor assembly being defined by at least two axially aligned outer rings; means for securing the rings of the second rotor assembly to each other in an axially aligned relationship; and means connecting the first mentioned and the second rotor assemblies for the transmission of rotational forces therebetween, the connecting means including means permitting relative radial movements between the rotor assemblies.

19. An inertial energy storage wheel according to claim 18 wherein the second rotor assembly connecting means comprises a plurality of circumferentially spaced, radially aligned, open apertures in the first and the second rotor ring assemblies;

torque transmitting bars disposed in the radially aligned apertures for interconnecting the first and second rotor assemblies and for accommodating differential relative dilations of the first and second rotor ring assemblies during high speed operation of the wheel, a first portion of each bar disposed in the first rotor ring assembly having a rectangular cross-section defined by a pair of sides oriented transversely to the hub center section and diverging in a radially inward direction;

the apertures in the first rotor assembly having a configuration complementary to the configuration of the first bar portion and including a pair of vertically oriented side walls which are transverse to the hub center portion;

the vertical sides and the side walls of the bars and the corresponding apertures, respectively, diverging in a radially inward direction at an angle chosen so that during a relative radial movement of the bar over a distance equal to the differential dilation between the first and the second rotor assemblies during high speed operation of the wheel the vertical bar sides and the side walls of the corresponding apertures in the first rotor assembly remain in continued, snug engagement.

20. An inertial energy storage wheel according to claim 19 wherein the bar includes a second, radially outwardly directed portion having a substantially constant, rectangular cross-section, and wherein the aperture in the second ring assembly engaged by the second portion has a configuration complementary to that of the second portion.

21. An inertial energy storage wheel according to claim 17 wherein the center portion of the hub has a cross-section which decreases from adjacent a center of the hub to the periphery of the center portion, and including an annular element disposed between and integrally constructed with the center portion and the teeth, the annular element having a thickness greater than the thickness of the center portion adjacent its periphery.

* * * * *